(12) United States Patent
Perkins

(10) Patent No.: US 6,525,809 B2
(45) Date of Patent: Feb. 25, 2003

(54) ALIGNMENT DEVICE FOR A GUIDED MISSILE SEEKER

(75) Inventor: Peter F. Perkins, Ridgefield, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 58 days.

(21) Appl. No.: 09/767,971

(22) Filed: Jan. 23, 2001

(65) Prior Publication Data
US 2002/0097391 A1 Jul. 25, 2002

(51) Int. Cl.$^7$ .............. G01B 11/26; F41G 7/00; G01J 5/02
(52) U.S. Cl. .............. 356/141.5; 244/3.16; 250/342
(58) Field of Search .............. 244/3.16; 356/152.1, 356/4.02, 141.2, 139.03, 141.5; 250/342

(56) References Cited

U.S. PATENT DOCUMENTS

| | | | |
|---|---|---|---|
| 4,021,662 A | * | 5/1977 | Mimms .................. 250/203 R |
| 4,168,813 A | | 9/1979 | Pinson et al. |
| 4,191,471 A | | 3/1980 | Courten et al. |
| 4,581,977 A | | 4/1986 | Ross et al. |
| 4,917,490 A | | 4/1990 | Schaffer, Jr. et al. |
| 5,047,638 A | * | 9/1991 | Cameron et al. ........... 250/330 |
| 5,175,600 A | | 12/1992 | Frank et al. |
| 5,410,398 A | | 4/1995 | Appert et al. |
| 5,424,872 A | | 6/1995 | Lecuyer et al. |
| 5,486,831 A | | 1/1996 | Rowland et al. |
| 5,672,872 A | | 9/1997 | Wu et al. |
| 6,266,198 B1 | * | 7/2001 | Lipscomb .................. 359/888 |

* cited by examiner

Primary Examiner—Stephen C. Buczinski
(74) Attorney, Agent, or Firm—Carlson, Gaskey & Olds

(57) ABSTRACT

An alignment device mounts to a missile system such that the view of a missile seeker is limited to limited fields of view at predetermined positions relative to a known reference such as the missile centerline. Once the alignment device is mounted to the missile system, an energy source emitting energy viewable by the seeker is located within a field of view. Once the seeker has locked-on to the energy source in a limited field of view, the pointing angle of the seeker can be observed by a measurement device communicating with the missile controller. Any pointing angle observed by the measurement device which differs from the known position defined by the alignment device, represents a displacement error of the seeker. Appropriate compensation is then applied to the missile controller such that alignment errors are accounted for.

25 Claims, 3 Drawing Sheets

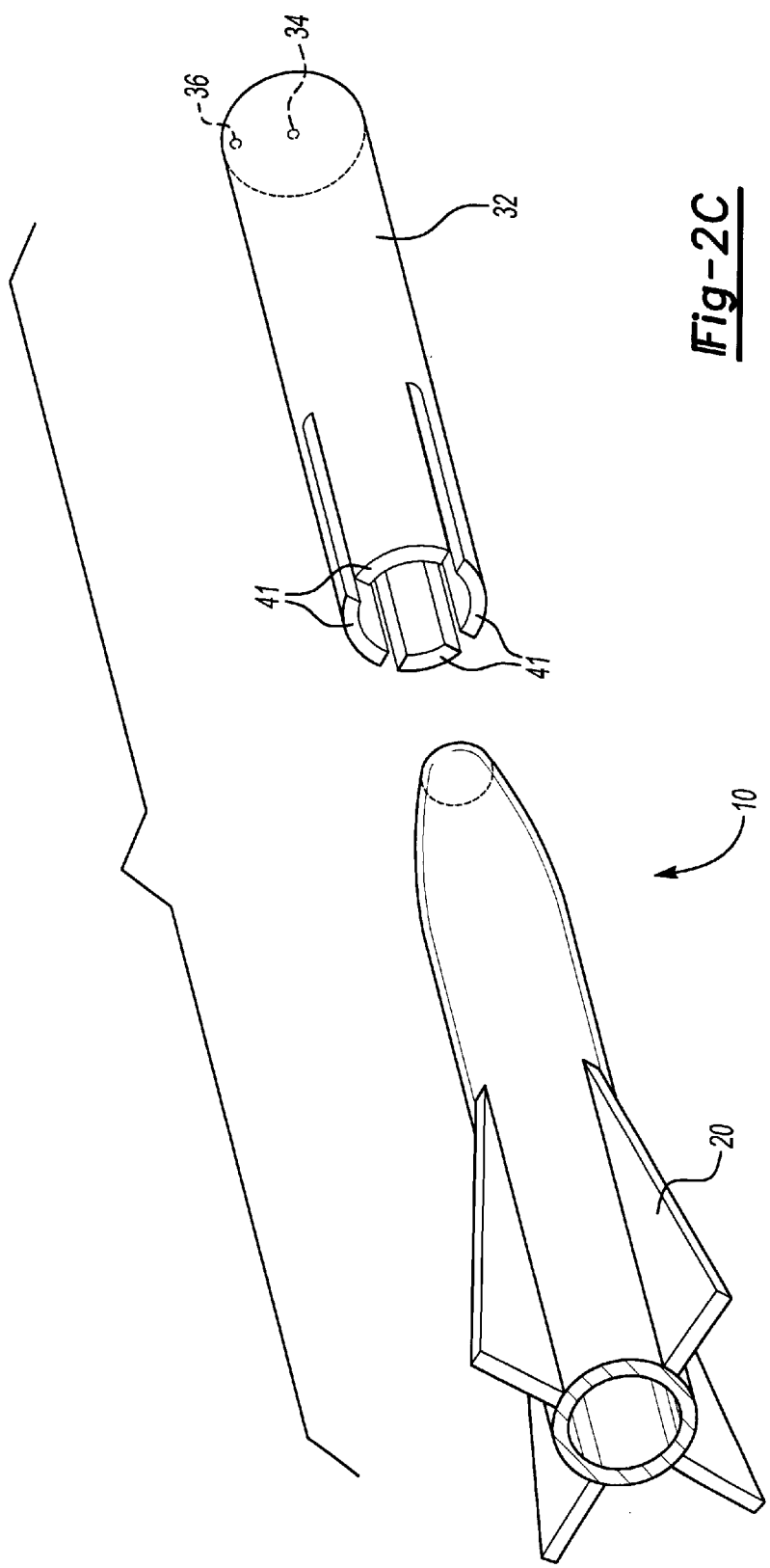

ALIGNMENT DEVICE FOR A GUIDED MISSILE SEEKER

BACKGROUND OF THE INVENTION

This invention was made with government support under Contract No.: DAAJ09-91-C-A004 awarded by the Department of the Army. The government therefore has certain rights in this invention.

The present invention relates to a sensor alignment device, and more particularly to a compact self-contained portable apparatus which utilizes the missile target acquisition capability for effective seeker alignment calibration.

In many modern weapon systems, a seeker is movably mounted to sense the presence of a target. The seeker aligns itself with the target to generate signals which are used to direct the flight of the system to the target. To be fully adaptable and effective, however, the alignment of the seeker with the weapon system must be assured to prevent aiming errors during operation. In some instances inherent alignment errors due to manufacturing, storage or handling may compromise the seeker alignment.

Currently, alignment or boresighting of a seeker requires a distant target and extensive infrared signal exposure. It is desirable, therefore, to provide a compact self-contained portable apparatus and method which utilizes the missile target acquisition capabilities to achieve effective alignment.

SUMMARY OF THE INVENTION

The alignment device according to the present invention mounts to a missile system such that the view of a missile seeker is limited to a first and second limited field of view by a first aperture and a second aperture. The first aperture is preferably located along the missile centerline at zero degrees azimuth and zero degrees elevation. The second aperture is located at a predetermined position at an outermost field of view of the seeker which corresponds to seeker roll alignment. By locating the apertures at predetermined positions relative to a known reference such as the missile centerline, inherent alignment errors of the seeker can be determined.

Once the alignment device is mounted to the missile system, an energy source emitting energy viewable by the seeker is located within the first limited field of view. The seeker searches until it reaches a steady state or "locked-on" position. Once the seeker has locked-on to the energy source in the first limited field of view, the pointing angle of the seeker can be read by a measurement device communicating with the missile controller.

Any pointing angle read by the measurement device which differs from the known position defined by the alignment device, represents a displacement error of the seeker. Appropriate corrective calibration is then applied to the missile controller such that the inherent azimuth and elevation errors are accounted for.

Once the inherent azimuth and elevation errors are accounted for, the seeker is commanded to slew toward the second aperture. The energy source is then located within the second limited field of view such that the seeker can view the energy source through the second aperture. As the second aperture is also located at a known position relative to the centerline, an error free seeker will have a pointing angle equal to the known position of the second aperture.

Any pointing angle observed by the measurement device which differs from the known position of the second aperture represents a roll displacement error of the seeker. Appropriate calibration is then applied to the controller such that the inherent roll errors are accounted for.

The corrective calibration is iterative and may be repeated until the desired accuracy is achieved. Moreover, additional apertures can be provided to further refine the seeker alignment at other positions relative to the known reference.

The present invention therefore provides a compact self-contained portable apparatus and method which utilizes the missile target acquisition capability for achieving effective seeker alignment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2C is a perspective view of the alignment device of FIG. 2A illustrating locators which mount the alignment device to the missile system.

DETAILED DESCRIPTION OF THE PREFERRED EMBODIMENT

Figure 1:
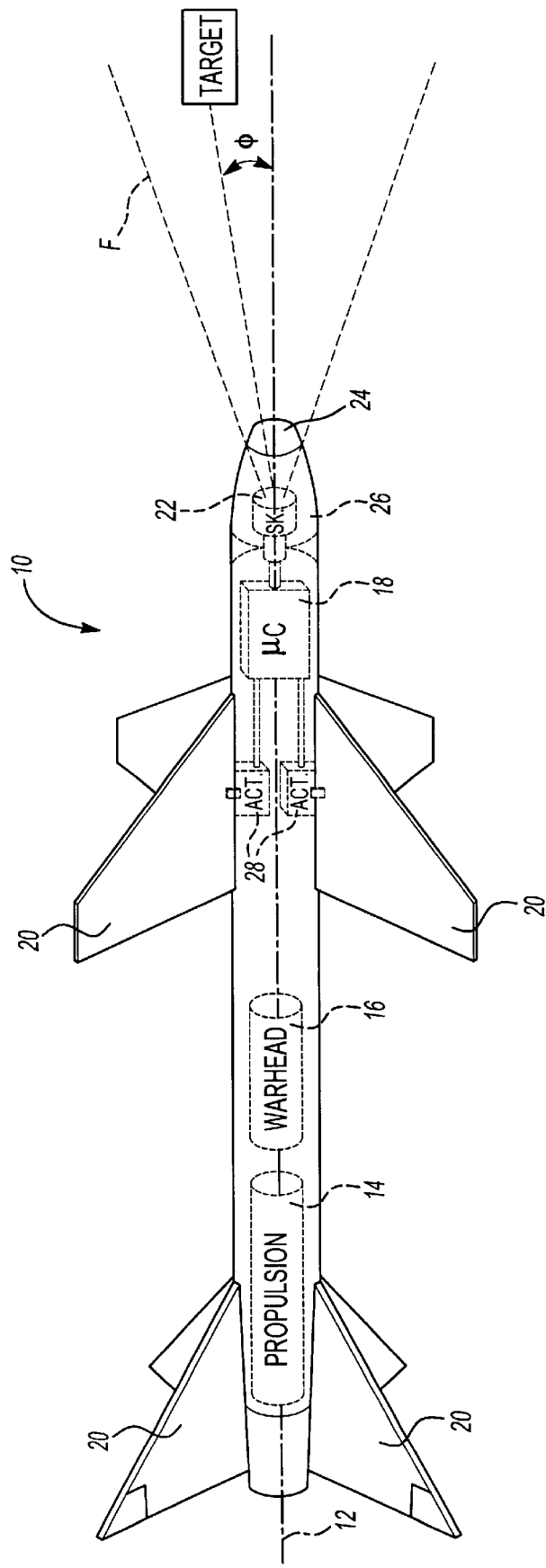
FIG. 1 is a general schematic view of a missile system for use with the present invention.

FIG. 1 schematically illustrates a missile system 10 for use with the present invention. The missile system 10 defines a first axis or center line 12 and generally includes a propulsion section 14, a warhead section 16, a controller 18 and a multiple of control surfaces 20. The controller 18 communicates with a seeker 22 which has a field of view F through a seeker window 24. It should be understood that although a particular missile system is illustrated in the disclosed embodiment, other self propelled and gravity type systems will benefit from the present invention.

The seeker 22 is preferably movably mounted by multi-axis gimbals 26 or the like along the centerline 12 of the missile 10 to sense the presence of a target T through the seeker window 24. Other seekers which mechanically or electronically "point" at the target, will also benefit from the present invention. The seeker 22 operates within the electromagnetic spectrum and preferably views the target T within the infrared spectrum. It should be understood that other seekers that operate in areas of the electromagnetic spectrum such as a seeker that responds to laser designation. The seeker 22 aligns itself with the target T to generate signals which are communicated to the controller 18. The controller 18 generates signals for actuating the control surfaces 20 through actuators 28 to direct the flight of the missile 10 in a manner to reduce the angle $\Phi$ such that the missile 10 is directed to the target T.

Figure 2A:
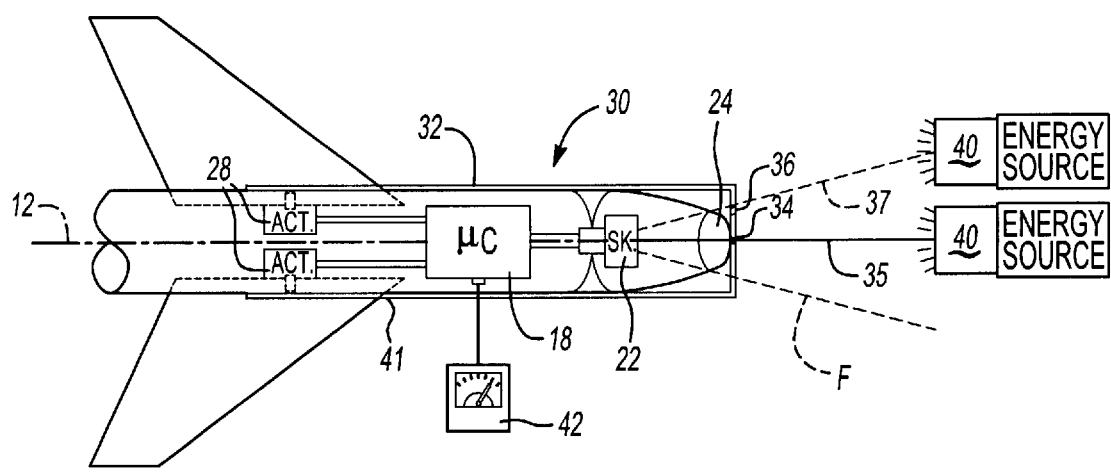
FIG. 2A is an expanded view of an alignment device according to the present invention mounted to the missile system of FIG. 1.

Referring to FIG. 2A, an expanded view of the missile 10 is illustrated. An alignment device 30 according to the present invention being mounted thereon. The alignment device 30 preferably includes a cover 32 which removably mounts to the missile 10 such that the view of seeker 22 through the seeker window 24 is substantially obscured. The cover 32 is preferably a substantially tubular member having a closed end with at least a first aperture 34 and a second aperture 36.

Figure 2B:
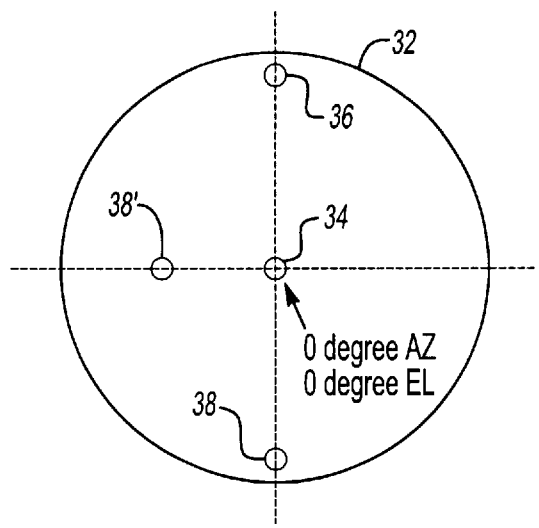
FIG. 2B is a front view of the alignment device of FIG. 2A illustrating the aperture locations.

The first aperture 34 and second aperture 36 (also illustrated in FIG. 2B) pass through the cover 32. As will be further described below, the first and second apertures 34,36 provide the seeker 22 with only a limited field of view therethrough. By locating the apertures 34,36 in a predetermined position in relation to the centerline 12, the seeker 22 is provided with a known limited view relative to the centerline 12 is provided. It should be understood that other reference datums will benefit from the present invention.

A locator 41 such as slots 41 (FIG. 2C) preferably assure that the cover 32 is aligned to a predetermined and repeatable position on the missile 10. The cover 32 closely pits to the missile 10 and the locators 41 engage the control surfaces 20 such that the apertures 34,36 are located in a substantially identical position each time the alignment device is mounted to a missile 10. Precise and accurate alignment is thereby repeatable assured.

The first aperture 34 is preferably located through the cover 32 along the centerline 12 to provide a first limited field of view 35. The first aperture 34 is located at zero degree azimuth and zero degree elevation. In other words, the first aperture 34 is located upon the exact centerline 12 of the missile 10.

The second aperture 36 is located at a predetermined position at an outermost field of view of the seeker 22 to provide a second limited field of view 37. The second aperture 36 preferably corresponds to the greatest angle-off or maximum slew position of the seeker 22. As many missile systems are roll-stabilized, roll misalignment is particular detrimental to missile accuracy. The second aperture 36 thus calibrates the seeker 22 roll alignment. Other apertures 38,38' (FIG. 2B) may additionally be provided to provide additional limited fields of view.

As will be further described below, an energy source 40 that is viewable by the seeker 22 represents the target T (FIG. 1). The energy source 40 emits energy within the electromagnet spectrum and preferably emits energy in the infrared spectrum. The energy source 40 provides a predetermined power in relation to the size of apertures 36, 37,38 such that the seeker 22 is provided with a point source. The energy source 40 thus represents a discrete target T at a predetermined location defined by the apertures 36,37,38.

A method for aligning the seeker of a missile system will now be described. However, it should be realized that the use of a missile seeker is for illustrative purposes only, and that the methodology of the present invention may be applied to other electromagnetic seeker systems.

The cover 32 is mounted to a missile 10 by sliding the cover 32 on the missile 10. The cover 32 closely fits to the missile 10 and the locators 38 assure that the apertures 34,36, are aligned to a predetermined and repeatable position on the missile 10.

A measurement device (illustrated schematically at 42) is then connected to the controller 18. The measurement device 42 communicates with the controller 18 to identify the displacement or pointing angle of the seeker 22 relative to a predetermined reference datum such as the centerline 12. The predetermined reference is preferably the first axis 12 zero degree azimuth and zero degree elevation position.

The energy source 40 is first located within the first limited field of view 35 such that the seeker 22 can view the energy source through the first aperture 34. The seeker 22 searches for the energy source 40 until it reaches a steady state or "locked-on" position. As the first aperture 34 is sized to provide the seeker 22 with only a point source, the exact position and distance of the energy source 40 from the cover 32 is relatively uncritical. As long as the energy source 40 is within the limited field of view 35, a point source is provided for the seeker 22 by the first aperture 34. The energy source 40 may advantageously be manually maintained within the limited field of view 35 by hand.

Once the seeker 22 has locked-on to the energy source 40 in the first limited field of view 35, the pointing angle of the seeker 22 can be read by the measurement device 42. As the first aperture 34 is located at a known zero degree azimuth and zero degree elevation relative to the centerline 12, an error free seeker 22 will have a corresponding pointing angle of zero degree azimuth and zero degree elevation.

However, a pointing angle read by the measurement device 42 which differs from the zero degree azimuth and zero degree elevation pointing angle represents a displacement error of the seeker 22. The corresponding azimuth and elevation can then be geometrically calculated from the pointing angle "observed" by the measurement device 42. Appropriate corrective compensation is then applied to the controller 18 such that the inherent azimuth and elevation errors are accounted for.

Once the inherent azimuth and elevation errors are accounted for, the seeker 22 is commanded to slew toward the second aperture 36. The energy source 40 is then located within the second limited field of view 37 such that the seeker 22 can view the energy source through the second aperture 36. The seeker 22 will then search for the energy source 40 until it reaches a steady state or "locked-on" position through the second aperture 36.

Once the seeker 22 has locked-on to the energy source 40 in the second limited field of view 37, the pointing angle of the seeker 22 is again observed by the measurement device 42. As the second aperture 36 is located at a known position an error free seeker 22 will have a corresponding pointing angle equal to the known position of the second aperture 36.

A pointing angle observed by the measurement device 42 which differs from the known position of the second aperture 36 represents a roll displacement error of the seeker 22. The corresponding roll displacement error can then be geometrically calculated from the pointing angle "observed" by the measurement device 42. Appropriate corrective roll compensation is then applied to the controller 18 such that the inherent roll alignment errors are accounted for.

The corrective calibration is iterative and may be repeated until the desired accuracy is achieved. Moreover, the additional apertures 38,38' (FIG. 2B) provide additional points to further refine the seeker alignment. Aperture 38, for example, represents a predetermined position at an outermost field of view of the seeker 22 180° opposite that of the second aperture 36. Aperture 38', for example, represents a predetermined position half way between the first aperture 34 and the second aperture 36. It should be understood that other predetermined aperture positions each corresponding to a known seeker pointing angle relative to a known datum may be particularly beneficial to alignment error correction of particular seeker systems.

Figure 3:
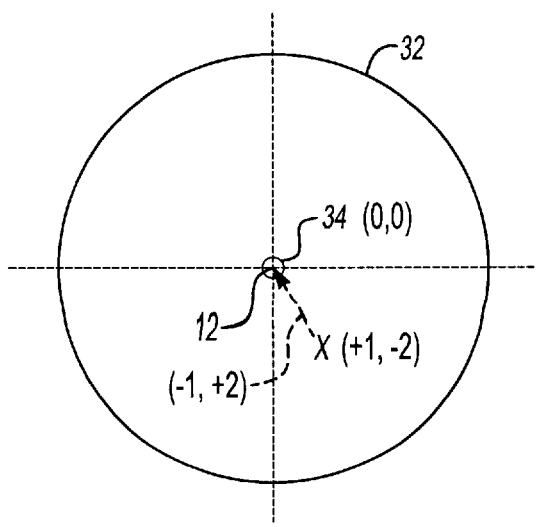
FIG. 3 is a general schematic view illustrating an alignment error of an exemplary seeker.

Referring to FIG. 3, an example of a representative seeker alignment error position is represented as +1 degree azimuth and −2 degrees elevation (schematically illustrated by an X) relative to the first axis 12. Without this inherent alignment error the seeker alignment would correspond with the first aperture 34 at the true zero degree azimuth and zero degree elevation position. This representative seeker alignment error may cause the missile to misidentify the exact location of the target. For example only, if the misaligned seeker was locked onto a target that was exactly in line with the true centerline of the missile, the controller would read the misaligned seeker position as −1 degree azimuth and +2 degrees elevation. Roll misalignment may further increase the seeker alignment error. This may lead to the missile missing the target or being outside the effective range of the missile warhead.

When the alignment device 30 is installed, the first aperture 34 is located at the true zero degree azimuth and zero degree elevation relative to the centerline 12 of the missile 10 (FIG. 1). However, when the seeker 22 locks on to the energy source 40 (FIG. 2A) through the first aperture 34, the seeker 22 must slew from its representative seeker alignment error position X (+1 degree azimuth and −2 degrees elevation) to point at the energy source (−1 degree azimuth and +2 degrees elevation to the misaligned seeker). Thus, a target at the true zero degree azimuth and zero degree elevation position relative to the missile centerline 12 is incorrectly identified to the missile controller as −1 degree azimuth and −2 degrees elevation relative to the missile centerline 12.

The pointing angle of the seeker may then be "observed" by the measurement device 42 and the corresponding azimuth and elevation is geometrically calculated. In this example, a −1 degree azimuth and +2 degree elevation bias is programmed into the controller 18 (FIG. 1) such that the seeker alignment error position X is accounted for. In other words, the controller is programmed to add a −1 degree azimuth and +2 degree elevation to correct the misaligned seeker.

The present invention therefore provides a compact self-contained portable apparatus and method which utilizes the missile target acquisition capability for achieving effective alignment calibration.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An alignment device for a guided missile system comprising:
   a removable cover for obscuring a seeker window of a guided missile system defining a first axis, said cover having a first aperture and a second aperture;
   said first aperture located through a substantially central position of said cover relative to the first axis to provide a first limited field of view to a seeker; and
   said second aperture spaced away from said first aperture to provide a second limited field of view to the seeker.

2. The alignment device as recited in claim 1, wherein said first aperture is located through said cover such that said first aperture is located along the first axis of the guided missile system.

3. The alignment device as recited in claim 1, wherein said first limited field of view is at zero degrees azimuth and zero degrees elevation relative to the first axis.

4. The alignment device as recited in claim 1, wherein said second aperture is located through said cover such that said second limited field of view is at an outermost field of view of the seeker.

5. The alignment device as recited in claim 1, further comprising a third aperture through said cover to provide a third limited field of view to the seeker.

6. The alignment device as recited in claim 1, further comprising an energy source visible to said seeker through one of said apertures.

7. The alignment device as recited in claim 6, wherein said energy source emits energy in the infrared spectrum.

8. The alignment device as recited in claim 6, wherein said apertures are just large enough to allow said seeker to identify said energy source.

9. The alignment device as recited in claim 1, wherein said cover includes a locator to repeatably mount said cover relative to the first axis and orient said first and second aperture to a predefined position.

10. The alignment device as recited in claim 9, wherein said locator removably engages a multiple of control surfaces.

11. A method of aligning a seeker of a guided missile system comprising the steps of:
   (1) obscuring the seeker window of a guided missile system except for a first limited field of view for a seeker relative to a reference;
   (2) emitting energy identifiable by the seeker at said first limited view;
   (3) identifying the displacement of the seeker relative to said reference;
   (4) obscuring the seeker window of the guided missile system except for a second limited field of view for the seeker relative to the reference and spaced away from the first limited field of view;
   (5) emitting energy identifiable by the seeker through the second limited field of view;
   (6) identifying the displacement of the seeker relative to the reference; and
   (7) compensating for the displacement of the seeker identified in said step (3).

12. A method as recited in claim 11, wherein said first limited field of view is at zero degrees azimuth and zero degrees elevation relative to a first axis of the guided missile system.

13. A method as recited in claim 11, wherein said step (2) further includes emitting energy in the infrared spectrum.

14. A method as recited in claim 11, wherein said step (3) further includes identifying a pointing angle of the seeker.

15. A method as recited in claim 11, further including the step of compensating for the displacement of the seeker identified in said step (6).

16. A method as recited in claim 15, further including iteratively performing said steps until a desired accuracy is achieved.

17. A method as recited in claim 11, wherein said step (1) further comprising covering the seeker window except for an aperture which provides the first limited field of view.

18. A method as recited in claim 17, wherein said step (1) further comprising aligning the aperture to a predetermined and repeatable position on the guided missile system.

19. A method as recited in claim 17, wherein said step (1) further comprising aligning the aperture with respect to a multiple of control surfaces of the guided missile system.

20. A method of aligning a seeker of a guided missile system comprising the steps of:

(1) obscuring the seeker window of a guided missile system except for a first limited field of view for the seeker and except for a second limited field of view for the seeker spaced away from said first limited view relative to a reference;

(2) emitting energy identifiable by the seeker through said first limited view;

(3) identifying an elevation and azimuth displacement of the seeker relative to said reference;

(4) compensating for the elevation and azimuth displacement of the seeker identified said step (3);

(5) emitting energy identifiable by the seeker through said second limited view;

(6) identifying a roll displacement of the seeker relative to said reference; and (7) compensating for the roll displacement of the seeker identified in said step (6).

21. A method as recited in claim 20, wherein said steps (2) and (5) further include emitting energy in the infrared spectrum.

22. A method as recited in claim 20, wherein said reference is a missile system centerline.

23. A method as recited in claim 20, wherein said step (1) further comprises covering the seeker window except for a first aperture which provides the first limited field of view and a second aperture which provides the second limited field of view.

24. A method as recited in claim 21, wherein said step (1) further comprises aligning the first aperture and the second aperture to a predetermined and repeatable position on the guided missile system.

25. A method as recited in claim 21, wherein said step (1) further comprises aligning the first aperture and the second aperture with respect to a multiple of control surfaces of the guided missile system.

* * * * *

UNITED STATES PATENT AND TRADEMARK OFFICE
CERTIFICATE OF CORRECTION

PATENT NO.     : 6,525,809 B1
DATED          : February 25, 2003
INVENTOR(S)    : Peter Perkins It is certified that error appears in the above-identified patent and that said Letters Patent is hereby corrected as shown below:

<u>Column 8,</u>
Lines 11 and 15, "21" should be -- 23 --.

Signed and Sealed this

Twenty-second Day of April, 2003

JAMES E. ROGAN
*Director of the United States Patent and Trademark Office*